Aug. 21, 1928.
J. DEMAND
1,681,724
WINDSHIELD WIPER ADJUSTER
Filed March 10, 1924
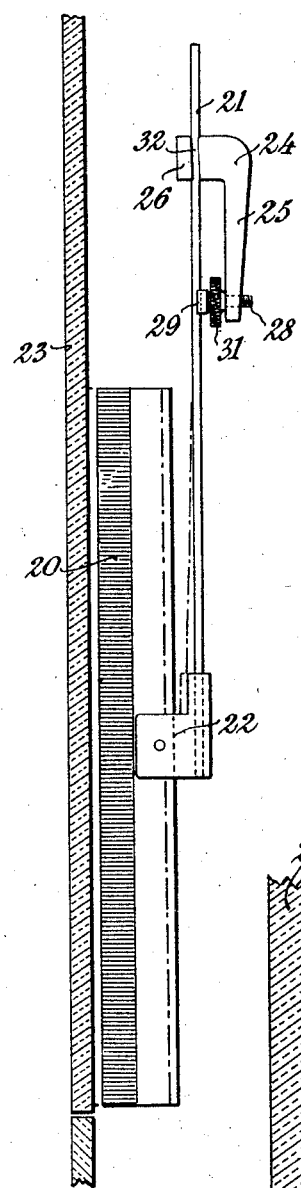
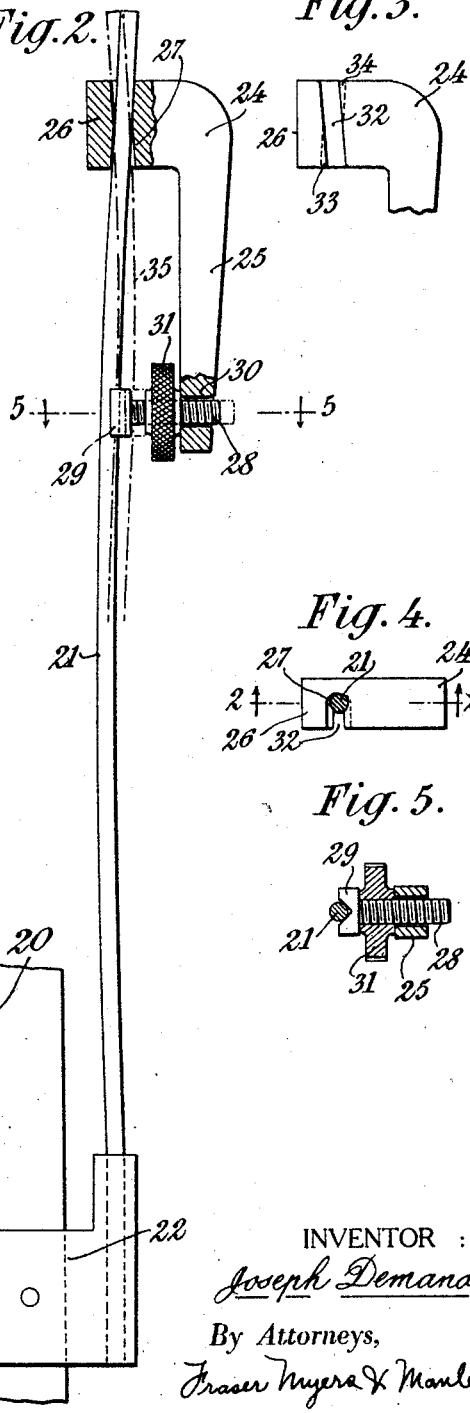
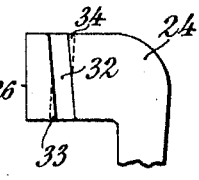
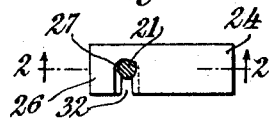
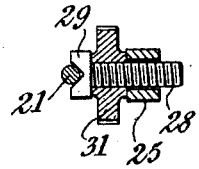
INVENTOR:
Joseph Demand
By Attorneys,
Fraser Myers & Manley Patented Aug. 21, 1928.

1,681,724

UNITED STATES PATENT OFFICE.

JOSEPH DEMAND, OF NEW YORK, N. Y., ASSIGNOR TO D. & R. AUTO PRODUCTS COMPANY, INC., OF JAMAICA, NEW YORK, A CORPORATION OF NEW YORK.

WINDSHIELD-WIPER ADJUSTER.

Application filed March 10, 1924. Serial No. 698,025.

This invention relates to a wire bending device adapted to adjust the position of a work member mounted at the end of a relatively slender arm. Although adapted for general application to devices of the character mentioned, it is particularly adapted for use in the adjusting of the wiper of a windshield cleaner, various types of which are commonly used upon motor vehicle windshields.

An object of the invention is to provide a device of the character described which shall be of relatively simple construction, and which may be readily applied to and adjusted from one position to another along the arm of the wiper.

In the accompanying drawings illustrating the preferred form of the invention:

Figure 1 is a view of the adjusting device applied to the arm of the wiper of a windshield indicating its position relative to the surface of a shield to be cleaned;

Figure 2 is a view of the same drawn to a larger scale and showing parts of the adjusting device in cross section, the cutting plane being taken along the line 2—2, Figure 4;

Figure 3 is a side view of the upper portion of the adjusting device, a part of which is shown in cross section in Figure 2;

Figure 4 is a top view of the adjusting device, the wiper arm being shown in cross section;

Figure 5 is a view in cross section through the operating mechanism of the adjusting device on the line 5—5, Figure 2.

Referring first to Figures 1 and 2 of the drawing, 20 represents the wiper element of a windshield cleaner supported in the usual manner at the end of a wiper arm 21 by means of the usual attaching means 22. In Figure 1, it is indicated as being slightly separated from the surface of the windshield 23, whereas in Figure 2, it is indicated as having been brought into wiping contact with the surface of the windshield by means of the adjusting device hereinafter to be described.

The adjusting device comprises a relatively rigid bar 24 of any appropriate form. In the preferred form herein disclosed, this bar comprises a relatively long leg 25 and a relatively short leg 26. The short leg is provided with means whereby the bar may be readily applied to the wiper arm of the windshield wiper and a mechanism in the nature of a jack is mounted near the end of the longer leg whereby the portion of the wiper arm to which the adjusting device is applied may be bent.

The attaching means, as herein disclosed, comprises a portion of the shorter leg having an under cut-slot 27 therein, which permits the bar 24 to be applied laterally to the arm of the wiper at any desired position along its length. This slot 27 is disposed in a relation of substantial parallelism with the longitudinal axis of the longer leg 25 and tends to limit angular movement of the bar as a whole with respect to the arm to which it is applied.

The bending of the arm by which the adjusting of the position of the wiper is effected may be accomplished by any suitable mechanism. The jack, herein disclosed as an illustration of such mechanism, comprises a bolt 28 having slotted head 29 adapted to receive the wiper arm 21, as indicated in Figure 5. The shank of the bolt is adapted for endwise movement through an opening 30 in the end of the long leg 25 of the bar and is provided with a knurled nut 31, the turning of which in the appropriate direction will cause the head 29 of the bolt to be moved away from the end of the leg 25 in which the jack is mounted.

The slot 27 in the attaching element of the adjusting device has an entrance portion 32 (Figures 1 and 3) of sufficient width to receive the wiper arm 21, but said entrance portion of the slot is disposed at such an angle with respect to other parts of the adjusting device that even when the head 29 is in its retracted position, as indicated in full lines in Figures 1 and 5, and in broken lines, as indicated in Figure 2, a wiper bar placed in the slotted head of the jack can be caused to enter the slot 27 only after slightly flexing the same so as to bring the portion of the arm adjacent the entrance portion of the slot into alinement therewith. The walls of the deeper portion of the slot flare outwardly in each direction from a central portion substantially equal in width to the diameter of the wiper bar, as indicated in Figures 2 and 3. The upper portion of the wall at the left side of the slot and the lower portion of the wall at the right side of the slot may be continuous from the entrance portion to the bottom, whereas the upper portion at the right side of the slot and the lower portion at the left side, as indicated in Figure 2, form the undercut portions, which receive the inserted arm and prevent its removal laterally without slightly flexing the same. This disposition of the various parts of slots relative to the position of the slotted head of the bending jack, which is shown in somewhat exaggerated proportions for the purpose of illustration, serves as a means to prevent the accidental detachment of the adjusting device from the wiper arm when the slotted head of the jack is retracted, yet the relation between the base portion of the slot and the head may be such as to permit free lengthwise movement of the adjusting device along the wiper arm from one position to another when the head is in such retracted position.

From the foregoing description, it will be apparent that the adjusting device may be applied to the wiper arm at any desired point by retracting the head of the jack, placing the slotted portion of its head in contact with the arm, and then snapping the arm through the entrance portion 32 of the slot in the shorter leg of the bar to its operative position in the base of the slot. As already explained, this will require slight flexing of the arm which will be relieved as soon as it reaches the base of the slot where it will be held from accidental displacement by the over hanging portions 33, 34, Figure 3. This flexing of the arm in order to place it within the slot, is indicated in broken lines at 35, Figure 2.

In Figure 1, the wiper, wiper arm, and parts of the bending jack, are illustrated in their normal positions in full lines and in an adjusted position in broken lines.

In Figure 2, said parts are shown in an adjusted position in full lines, the retracted position of the screw jack, during the insertion of the arm, being indicated in broken lines.

After the adjusting device has been applied, the adjustment of the wiper 20 into proper wiping relation with the windshield 23 may be readily effected by the rotation of the nut 31. Should it be desired at any time to shift the adjusting device to a higher or lower position in order to place it out of the line of sight, or for other reasons, this may be readily effected by retracting the head of the bending jack after which the adjusting device may be freely moved along the arm to any desired position.

It is obvious that the adjusting device may be applied to the wiper arm of any of the well known windshield cleaning devices of either the manual or automatically operated types, and in view of the facility with which it may be applied at any point along the wiper arm, such application may be effected without detaching the wiper arm from either the wiper or the operating mechanism.

The parts of the adjusting device may be constructed of brass, aluminum, or any other appropriate material, and the wiper arm should preferably be constructed of some appropriate resilient material, such for example, as steel.

Although herein disclosed as in the form of a rigid bar having the attaching means at one end and the wire bending means at the other, the invention is not intended to be limited to an adjusting device of this specific form. In principle, the adjusting device comprises an implement adapted to engage the wiper arm at three points along its length and it includes means whereby a relative movement may be effected whereby force is exerted at the intermediate point in a direction opposite to forces exerted at the extreme points. In its broadest aspect, the invention is intended to include any equivalent structure within the scope of the appended claims, which embodies this general principle.

What I claim is:

1. The combination, with a wiper having a flexible supporting arm, of an adjusting device therefor comprising a bar having an open channel recessed in one of its lateral surfaces to receive said arm and thereby permit said bar to be applied to said arm by relative lateral movement and moved lengthwise thereof, the walls of said channel affording contacting surfaces whereby angular movement of said bar in the plane common to the axes of said bar and arm is restrained, a jack mounted in said bar at a distance from its recessed portion, said jack having a head provided with a groove to receive said arm and means for effecting relative movement between said head and said bar in a direction such as to bind said arm in the recessed portion of said bar and flex the intervening portion of said arm to effect an adjustment.

2. The combination, with a wiper having a flexible supporting arm, of an adjusting device therefor comprising a bar having an undercut channel recessed in one of its lateral surfaces to receive said arm and thereby permit said bar to be applied to said arm by relative lateral movement and moved lengthwise thereof, the walls of said channel affording means whereby angular movement of said bar in the plane common to the axes of said bar and arm is restrained, and a jack mounted in said bar at a distance from said slotted portion, said jack having a head provided with a groove to receive said arm and means for effecting relative movement between said head and said bar in a direction such as to bind said arm in the recessed portion of said bar and flex said arm to effect an adjustment, the entrance to the channel in said bar and the position of said grooved head being so relatively disposed that the arm must be flexed when applying and removing said adjusting device, whereby said device may be snapped on or off said arm but will not be accidentally detached when said head is retracted to free said arm and thereby permit movement of the adjusting device from one position to another therealong.

3. A wiper-adjusting device adapted for lateral application to a flexible supporting arm, said device comprising a bar having a grooved attaching portion at one end providing surfaces adapted to engage parts of the arm when applied and restrain relative angular movement of the bar and arm in the plane common to their axes, but separable therefrom by lateral movement in a different plane, and a jack comprising a headed nut and a screw mounted for transverse movement in the other end of said bar, said screw having its axis in the plane common to the axes of said bar and arm, said nut comprising means for effecting an endwise movement of said screw relative to the part of the bar in which it is mounted.

4. A wiper-adjusting device comprising a bar having, at one end, an attaching portion provided with an undercut slot disposed in a relation of substantial parallelism with the length of said bar and adapted to receive a wiper arm, and means comprising relatively movable elements mounted in the opposite end of said bar whereby the relative positions of the bar and arm may be forcibly varied, thereby binding the arm in said slot and causing the arm to be flexed.

5. A wiper-adjusting device comprising an angle bar having a relatively short leg and a relatively long leg, an undercut slot opening into one side of the short leg and disposed in substantial parallelism with the longitudinal axis of the long leg, said slot being adapted to receive a wiper arm, and means comprising relatively movable elements mounted in the long leg of said bar whereby the relative positions of said bar and arm may be forcibly varied, thereby binding said arm in said slot and causing said arm to be flexed.

In witness whereof, I have hereunto signed my name.

JOSEPH DEMAND.